(12) United States Patent
Henssien et al.

(10) Patent No.: US 10,583,987 B2
(45) Date of Patent: Mar. 10, 2020

(54) WEAR RESISTANT FUNNEL SHEET ELEMENT FOR MATERIAL GUIDE CHUTE (71) Applicant: SANDVIK INTELLECTUAL PROPERTY AB, Sandviken (SE)

(72) Inventors: Adrien Henssien, Malmo (SE); Mats Malmberg, Rydsgard (SE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 0 days.

(21) Appl. No.: 16/311,461

(22) PCT Filed: Jun. 23, 2016

(86) PCT No.: PCT/EP2016/064577
§ 371 (c)(1),
(2) Date: Dec. 19, 2018

(87) PCT Pub. No.: WO2017/220152
PCT Pub. Date: Dec. 28, 2017

(65) Prior Publication Data
US 2019/0202636 A1 Jul. 4, 2019

(51) Int. Cl.
B65G 11/00 (2006.01)
B65G 11/18 (2006.01)
B65G 11/08 (2006.01)
B65G 11/14 (2006.01)

(52) U.S. Cl.
CPC .......... *B65G 11/083* (2013.01); *B65G 11/146* (2013.01); *B65G 11/18* (2013.01); *B65G 2207/30* (2013.01)

(58) Field of Classification Search
None
See application file for complete search history.

(56) References Cited

U.S. PATENT DOCUMENTS

| 4,651,867 A | 3/1987 | Tilles et al. |
| 4,727,913 A | 3/1988 | Bliss |
| 4,889,219 A | 12/1989 | Key |
| 5,472,768 A * | 12/1995 | Anson .................. B65G 11/083 138/157 |
| 2006/0006486 A1 | 1/2006 | Seo et al. |
| 2009/0139828 A1* | 6/2009 | Burstrom ............. B65G 11/083 193/25 E |
| 2011/0041964 A1 | 2/2011 | Schuh et al. |
| 2015/0284183 A1 | 10/2015 | Houghton et al. |

FOREIGN PATENT DOCUMENTS

| CN | 1097396 A | 1/1995 |
| CN | 203173259 U | 9/2013 |
| DE | 3143922 A1 | 7/1982 |
| DE | 3309445 A1 | 9/1984 |

(Continued)

*Primary Examiner* — Kavel Singh
(74) *Attorney, Agent, or Firm* — Corinne R. Gorski (57) ABSTRACT A wear resistant funnel sheet element for a material guide chute includes first and second edges located at a tapered angle from each other. Interlinking fastening features are provided in order to mate the respective edges of at least one of the wear resistant funnel sheets to form a funnel element. The sheet element may be a molded flat piece of a rubber material, which serves as an interchangeable wear part on a material guide chute.

11 Claims, 7 Drawing Sheets (56) References Cited

FOREIGN PATENT DOCUMENTS

| | | | |
|---|---|---|---|
| DE | 8618197 | U1 | 9/1986 |
| DE | 29621179 | U1 | 5/1997 |
| DE | 202004003558 | U1 | 7/2004 |
| EP | 0157292 | A2 | 10/1985 |
| EP | 304020 | A1 | 2/1989 |
| EP | 329001 | A1 | 8/1989 |
| GB | 1075372 | A | 7/1967 |
| GB | 2276151 | A | 9/1994 |
| GB | 2556952 | A | 6/2018 |
| KR | 20100054269 | A | 5/2010 |
| WO | 2006031188 | A1 | 3/2006 |

* cited by examiner

WEAR RESISTANT FUNNEL SHEET ELEMENT FOR MATERIAL GUIDE CHUTE

RELATED APPLICATION DATA

This application is a § 371 National Stage Application of PCT International Application No. PCT/EP2016/064577 filed Jun. 23, 2016.

FIELD OF INVENTION

The present invention relates to a wear resistant flexible funnel sheet element to form part of a material guide chute.

BACKGROUND ART

The processing of bulk material typically involves transfer of the material between processing units and to transport vehicles or stock pile locations. Guide chutes represent a convenient conduit adapted for directing generally vertically falling material to a desired destination. Material chutes also find application within construction sites, especially for tall buildings to convey debris material from an elevated level to the ground safely.

Generally, chutes are formed from a series of conical funnel sections each having a smaller diameter outlet and a larger diameter inlet to allow the sections to overlap one another and provide a telescopic assembly in use that may be collapsed axially for storage and transport when not in use. Example material guide chutes are described in CN 203173259; KR 2010-0054269; US 2006/0064863; DE 202004003558; DE 29621179; CN 1097396; EP 329001; U.S. Pat. No. 4,889,219; EP 304020; DE 8618197; U.S. Pat. No. 4,727,913; and DE 3143922.

Conventional funnel arrangements as found in the prior art are disadvantageous for a number of reasons. In particular, each funnel section typically requires a degree of stiffness (or rigidity). This structural rigidity is required due to the conventional mechanism for mounting the funnel sections together axially to form the chute. Accordingly, the sections are typically formed from a rigid material or include stiffening reinforcements that appreciably limit adjustability, increase the likelihood of the chute becoming blocked by the material, are subject to accelerated wear and increase manufacturing complexity. Accordingly, what is required is funnel part for a material guide chute to direct a flow of material that addresses the above problems. What is also desirable is a funnel construction which can be manufactured as economically as possible.

SUMMARY OF THE INVENTION

It is an objective of the present invention to provide a wear resistant funnel sheet element capable of forming part of a funnel section of a material guide chute. The element functions as a wear part that may be readily interchanged and conveniently mounted/decoupled at the funnel section and the guide chute to reduce manufacturing cost and complexity relative to existing funnel sections. It is also advantageous to provide a flexible funnel sheet element configured to reduce the likelihood of blockage by the localised accumulation of material within the guide chute during use.

The invention is embodied by providing a flexible wear resistant funnel sheet element to form part of a funnel section at a guide chute that is more flexible than a corresponding holder funnel element to which the flexible funnel element is attached. Due to the mechanism by which the flexible element is axially coupled to the holder element, the funnel section and guide chute are optimised to allow component parts of different materials to be interconnected such that each part is, in turn, optimised for its particular function. In particular, forming the flexible element as a wear resistant sheet element enables an economical construction that can be used to form a funnel for coupling to a holder element. This facilitates recycling as composite reinforced structures are avoided. Additionally, the flexible sheet element comprises a hardness and a stiffness that is appreciably less than the holder element to provide a wear part that is lightweight for ease of handling and that may be readily flat packed for transport before, during and after use. The sheet funnel section of the invention is preferably optimised for extending the service lifetime of the component parts, in particular the flexible element is capable of flexing considerably during use to avoid abrasive wear, damage and material build-up.

According to a first aspect of the present invention there is provided a wear resistant funnel sheet element for a material guide chute according to claim 1. Such a sheet element includes fastening features at an edge thereof in order to mate with a corresponding edge and form a funnel element from at least one of said wear resistant funnel sheets; wherein the formed funnel element is capable of interconnection with a holder funnel element axially to form a funnel section. The funnel section is then able to be part of a telescopic material guide chute. The opposing edges are tapered (inclined, sloped, converging) at an angle relative to each other in order to form a three dimensional funnel section when joined by the fastening features. Preferably the sheet element is substantially symmetrical although it is possible that asymmetrical shapes are possible that could still roll into a suitable cone shape.

The fastening features preferably enable releasable connection between edge portions of either the same funnel sheet element or a combination of two or more sheet elements in order to be able to assemble a frustoconical shape or, indeed, where three or more sheet elements are joined and not substantially curved: a frusto-pyramid shape funnel section. In a preferred form the fastening features include an interlinking connector element with a through-hole that is alignable with other connector elements in order for a rod element to be introduced and form a "seam" joining the edges of the funnel sheet element(s). Preferably the through-hole provides structures (e.g. moulded teeth protrusions within the through-hole) to facilitate insertion of a rod, to hold the seam longitudinally place. The protrusions preferably reduce friction (by having a smaller contact area) so that insertion is facilitated. The rod may have a flange or other holding feature in order to prevent longitudinal movement once in place.

The wear resistant funnel sheet element of the invention is preferably moulded as a flat, generally trapezoid-like shape. If the preferred funnel shape is frustoconical then the sheet may have convex and concave curves on the upper and lower edges respectively and flat edges on the converging opposing sides. Alternatively, the upper and lower edges may be straight, most suited for a pyramid or frustopyramidal funnel element. Preferably one of the converging edges will include an overlap flange in the vicinity of the fastening features in order to avoid exposing a fastener/connector on the interior wall of the funnel element when assembled. It will be apparent that material falling through the chute will come into contact with the internal walls thereof and could damage fastening features if these are exposed.

The funnel sheet element is preferably moulded from a suitable rubber or equivalent material which has a degree of flexibility, e.g. Shore A hardness of 50-70°, both to permit being rolled into a cone shape and for enabling the assembled funnel element to retain flexible qualities when in place as part of a telescopic chute. In order to achieve the desired flexibility and economic benefits the sheet may be moulded with raised edges or other ribbing to provide additional strength in the vicinity of the fastening features. Other structural features may be implemented according to known practices to optimise for manufacture.

Preferably the sheet element, either alone or in combination with multiple like sheet elements, is formable into a frustoconical funnel element and mountable to a holder funnel element thereby forming a funnel section. Preferably the flexibility and an axial length of the funnel element is greater than the holder funnel element; forming a radial facing surface positionable against a radial facing surface of the holder funnel element to allow the flexible funnel element and the holder funnel element to be interconnected axially to form the funnel section. Preferably there is at least one connection element to radially engage a cooperative connection element at the holder funnel element to releasably attach the flexible funnel element to the holder funnel element. In a preferred form, the at least one connection element is at least one opening in the upper, convex, edge of the sheet element. The opening may be a square shape sized to receive corresponding connection features moulded with the holder funnel element.

Preferably, a radially inward facing surface of the flexible funnel element is positionable against a radially outward facing surface of the holder funnel element to allow the funnel elements to be interconnected axially. In particular, the flexible funnel is configured for positioning around the holder funnel such that the holder funnel provides an internal skeleton or structural support for the deformable flexible funnel located around it. Such an arrangement is advantageous to provide quick and convenient mounting of the flexible funnel at the holder funnel and to protect the flexible funnel at the inlet region as material is fed into each funnel section from the funnel section positioned immediately above. Accordingly, the internally mounted holder funnel maintains the conical shape profile of the outer flexible funnel that may otherwise distort in contact with the bulk material as it falls under gravity.

As mentioned, the connection mechanism between funnel holder and assembled funnel sheet comprises a plurality of holes formed through the flexible funnel element to receive a plurality of projections extending radially at the holder funnel element. The holes and projections represent a convenient mechanism for releasable connection of the two funnel elements and in particular to allow the radially outer flexible funnel to be slid over the internally mounted holder funnel. In one embodiment, the respective funnel elements comprise between 4 to 10, 5 to 9 or 6 to 8 holes and projections. These types of connection elements also facilitate manufacturing of the respective funnel elements and avoids complicated assemblies.

Preferably, the flexible funnel element, formed from one or more funnel sheet elements curved into shape, comprises an inlet end axially separated from an outlet end, a diameter of the inlet end being greater than a diameter of the outlet end. Preferably, the holder funnel element comprises an inlet end axially separated from an outlet end, a diameter of the inlet end being greater than a diameter of the outlet end; wherein a diameter of the inlets of the flexible and holder funnel elements are substantially equal to allow the funnel elements to be connected together at or towards the axial position of the inlets. Such a configuration is advantageous to allow the inlets of the respective funnel elements to be co-aligned axially and in particular to mount the flexible funnel element externally around and about the internally mounted support or holder funnel element. Due to the relative difference in the axial lengths of the two funnel elements, the majority, and in particular, over half of the axial length of the flexible funnel element, is suspended and exposed below the holder funnel element to define a conical material contact section. The relative axial shortness of the holder element is advantageous to avoid contact with the bulk material and to avoid material adhering to the inside surface of the more rigid holder element. Preferably, the flexible funnel element and/or the holder funnel element comprise a truncated cone shape profile. Alternatively, the funnel elements may comprise any generally funnel-shaped profile providing the inlet ends of the funnel element comprise the same dimensions with respect to inlet diameter.

Optionally, an angle by which a wall of the assembled cone extends relative to a longitudinal axis of the funnel element is in the range 3 to 30°, 5 to 20°, 6 to 18°, 8 to 14° or 10 to 13°. The taper angle of the cones represents a balance between containing the material within the guide chute via a control material flow path and ensuring material is free flowing through the funnel sections to minimise the occurrence of blockages.

Preferably, the flexible funnel element may comprise a Shore A hardness of 30 to 100°; 40 to 90°; 50 to 80°; optimally 60°. Optionally, the holder element comprises a Shore D hardness of 40 to 60° or 45 to 55°. Accordingly, the flexibility of the radially outer cone element is greater than that of the radially inner support or holder funnel element. The flexibility of the outer wear cone protects the funnel section against abrasive contact with the material falling through the chute. The flexibility of the wear cone also minimises the risk of abnormally large objects becoming stuck within the chute, for example in a case of an upstream machine breakdown resulting in a detached machine part falling in the material flow through the chute. The high flexibility of the main body of the funnel element avoids build-up of sticky process materials on the internal surface of the chute as the cone wall flexes freely to disturb any build-up causing it to dislodge and fall downwardly with the main flow of material. The subject invention is advantageous in that the weight of the build-up deposit on the inside surface of the flexible element greatly facilitates the flexing of the cone and provides self-detachment from the cone internal surface.

In accordance with the invention, the flexible funnel element may be formed from one or a plurality of sheet body pieces connected together to form a funnel shaped unitary assembly. Via the fastening features the assembled funnel element will have one or more "seams" visible externally and internally.

As mentioned, a radial thickness of a wall of the flexible funnel element may be substantially uniform along a full axial length of the funnel element or may be non-uniform. Optionally, the wall thickness may be greater at or towards one axial end relative to the opposite end. Optionally, the change in the wall thickness may be gradual or may be a step change. Similar configurations of wall thickness (uniform or non-uniform) also apply to the holder funnel element. Optionally, a wall thickness of the flexible funnel element is greater than a wall thickness of the holder funnel element. The wall thickness of the flexible element is dependent upon the constituent material and may be adjusted to suit different applications and material feed types.

Accordingly to a second aspect of the present invention there is provided a material guide chute according to claim 11. The chute provides a conduit for the transfer of material, comprising a plurality of the funnel sections.

According to another aspect of the present invention there is provided a funnel section to form a part of a material guide chute, the funnel section comprising: at least one wear resistant funnel sheet element including fastening features at an edge thereof in order to mate with a corresponding edge and form a funnel element in a frustoconical shape with a larger diameter inlet end and a smaller diameter outlet end from at least one of said wear resistant funnel sheets; and a ring-shaped holder funnel element for connecting to the funnel element at the inlet end.

The holder funnel element is releasably attachable to the flexible funnel element to form an axially extending assembly; wherein the flexible funnel element comprises: a flexibility and an axial length greater than the holder funnel element; a radial facing surface positionable against a radial facing surface of the holder funnel element to allow the flexible and holder funnel elements to be interconnected axially to form the funnel section; at least one connection element provided respectively at the flexible funnel element and the holder funnel element to cooperatively engage and connect the flexible and holder funnel elements axially.

Optionally, an axial length of the holder funnel element is 10 to 50%; 15 to 45%; 20 to 35%; 22 to 30% or 23 to 27% of an axial length of the flexible funnel element. Such an arrangement is advantageous to provide the majority of the length of the flexible element is presented in the material flow path and to avoid material contacting the internal facing surface of the holder element that may otherwise be susceptible to material build-up.

Optionally, the funnel section further comprises a guide ring mountable at an inlet end of the holder funnel element, the guide ring comprising at least one attachment element to enable the funnel section to be mounted to an auxiliary support structure and/or other funnel sections forming part of the guide chute. The guide ring may be formed integrally or non-integrally with the holder element. Preferably, the guide ring is formed from a first material and the holder element is formed from a second material. Optionally, the flexible sheet element is formed from a third material different from the first and second materials. Further, the second and third materials comprise polymer materials whilst the first material of the guide ring may be formed from a metal such as steel and/or may comprise polymer components. Optionally, the funnel section may further comprise a strap or brace to extend externally around the flexible and holder funnel elements so as to assist the releasable locking of the two components together.

According to a yet further aspect of the invention there is provided a method of constructing a funnel element, for connection to a holder funnel element in order to form a funnel section for a material guide chute, including the steps of: providing at least one wear resistant funnel sheet element that includes fastening features at an edge thereof, fastening corresponding edges of one or more funnel sheet elements by bending about a longitudinal axis thereof, thereby forming the funnel element in a frustoconical shape.

In a preferred form the fastening features include a plurality of alignable openings and releasable fastening of adjacent funnel sheet elements (or opposing edges of a single funnel sheet element) is achieved by threading a rod through the alignable openings. In a preferred form an edge of the funnel sheet element includes an overlap flange adjacent the fastening features that, in use, conceals the fastening features at least from the interior of the funnel element when assembled.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 7:
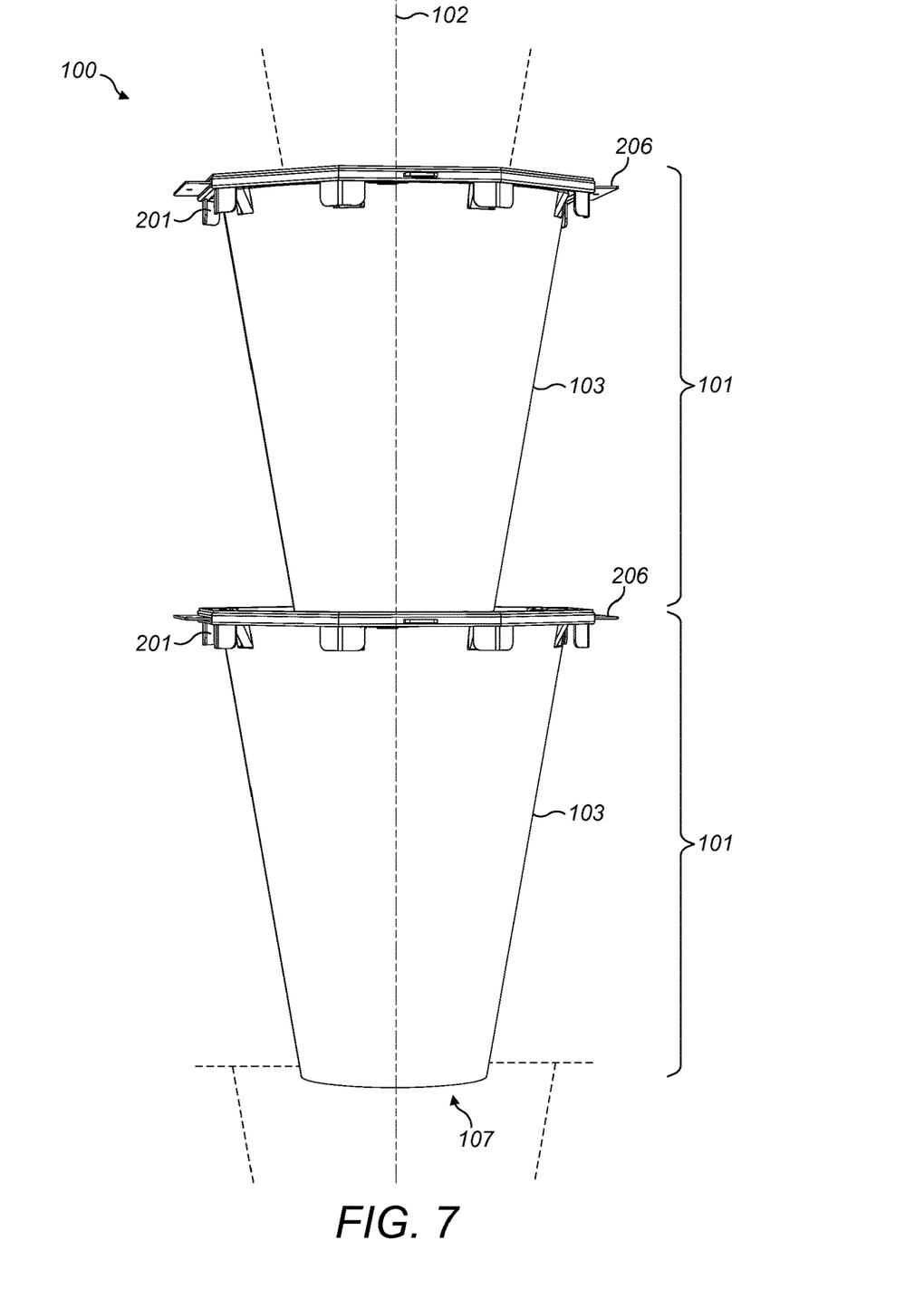
FIG. 7 illustrates a side elevation view representing a bulk material guide chute, assembled from multiple funnel sections.

Referring to FIG. 7 for context, a bulk material guide chute 100 comprises a plurality of axially arranged funnel sections 101. Each funnel section 101 comprises a generally truncated cone shape profile having a larger input end diameter relative to a smaller outlet end diameter, each section 101 being centred on a longitudinal axis 102 extending through chute 100. Each respective outlet end is configured to sit radially inside a respective inlet end of a neighbouring funnel section with the two opposed ends overlapping axially such that material is capable of falling through the guide chute to be contained and directed by the telescopically arranged funnel sections 101. The present invention is concerned with the construction of funnel sections 101, particularly from a funnel element 103 (FIG. 4) and a holder funnel element 201 (FIG. 5). Most particularly, the funnel element 103 is formed from one or more sheet funnel elements 104 (FIGS. 1 and 2) and gives a required flexibility during use.

Figure 6:
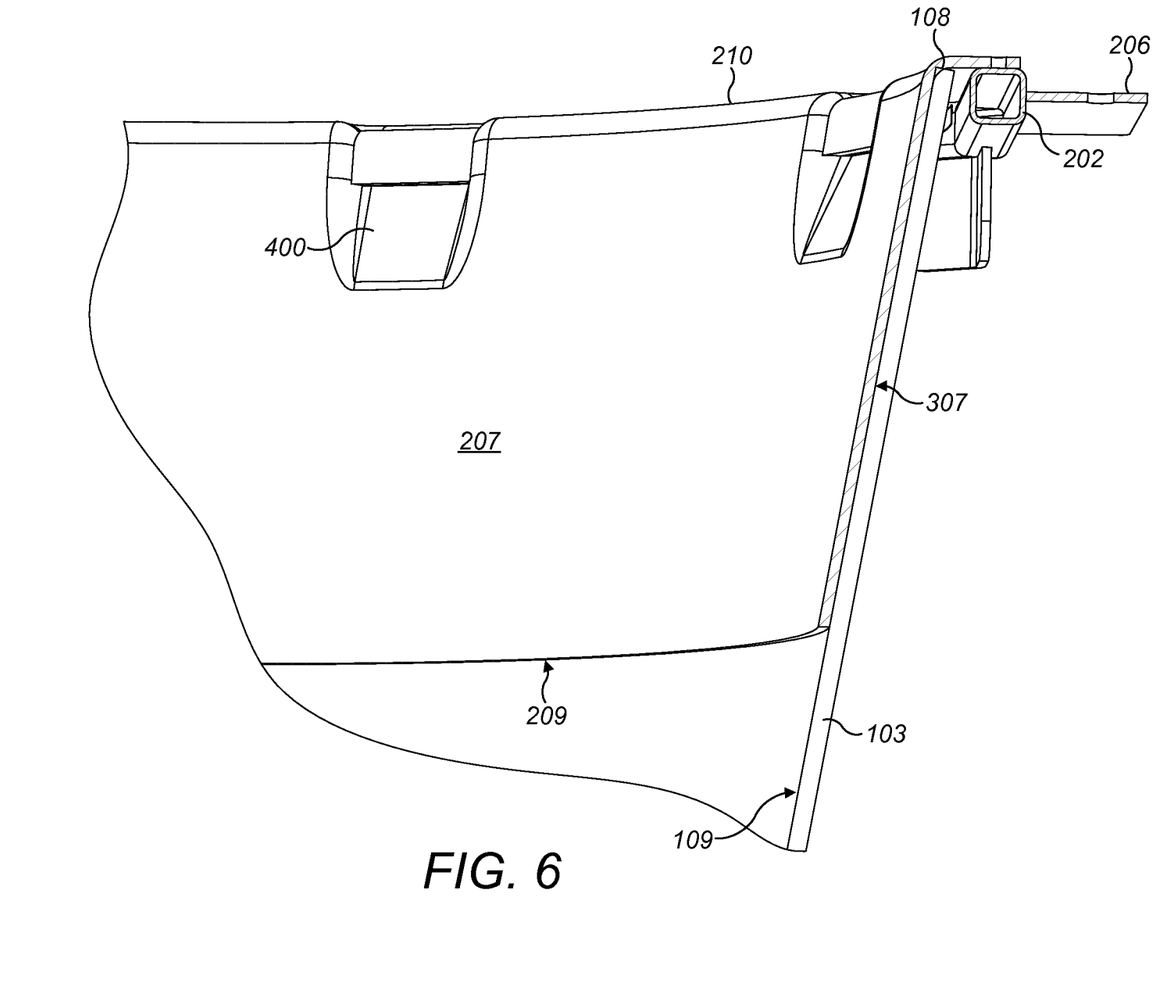
FIG. 6 illustrates a side elevation section view of the inlet region of a funnel section of a material guide chute, assembled from a holder funnel element according to FIG. 5 and a funnel element according to FIG. 4.

Each funnel section 101 is formed as a modular unit in which separate components are assembled together to form a unitary structure. In particular, each flexible funnel element 103 is releasably mounted to the holder funnel element 201 that is in turn releasably mounted with a guide ring 202. Both the funnel and holder elements 103, 201 comprise a truncated cone shaped profile that are configured to overlay one another axially to define a funnel section inlet and outlet. Detail of the inlet part of the assembly is shown in FIG. 6.

Figure 4:
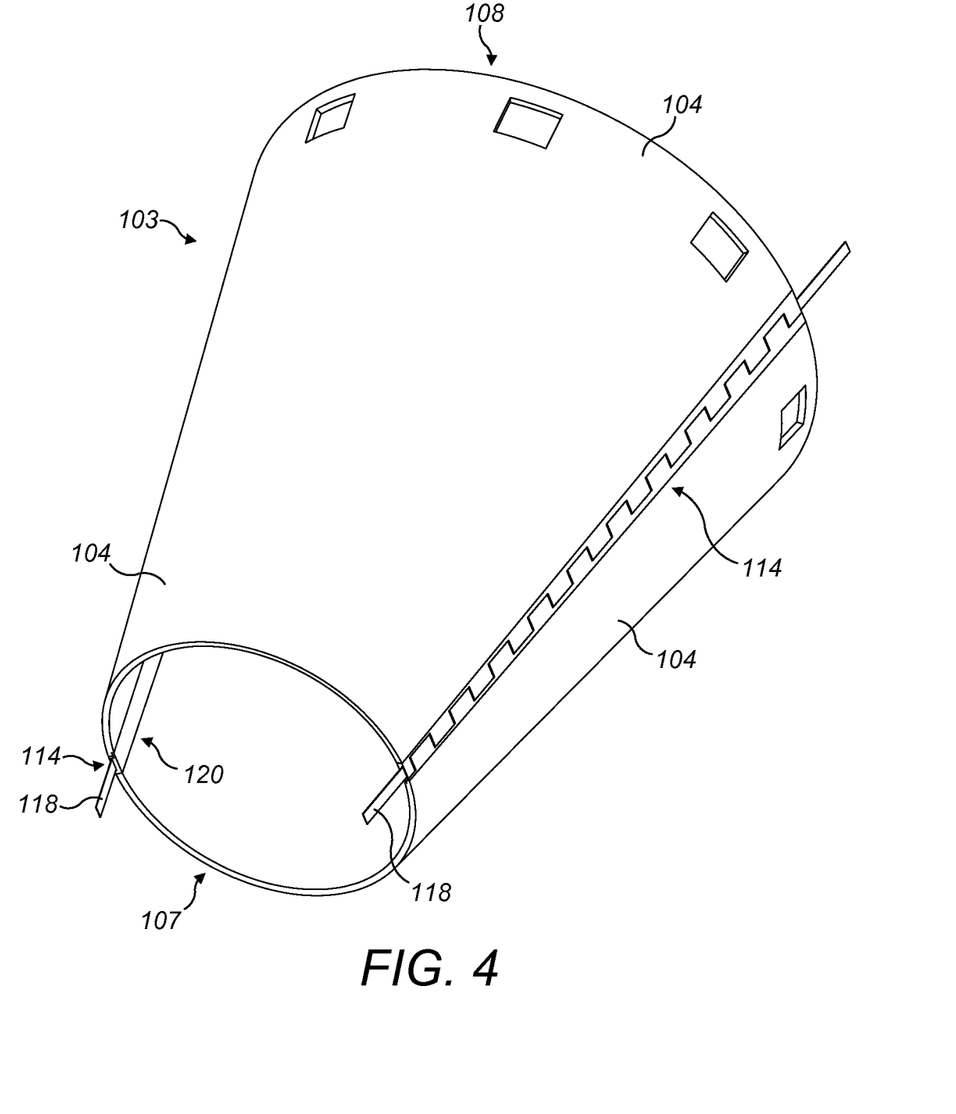
FIG. 4 illustrates a perspective view of a funnel element, assembled from two of the sheet elements shown in FIGS. 1 and 2.
Figure 5:
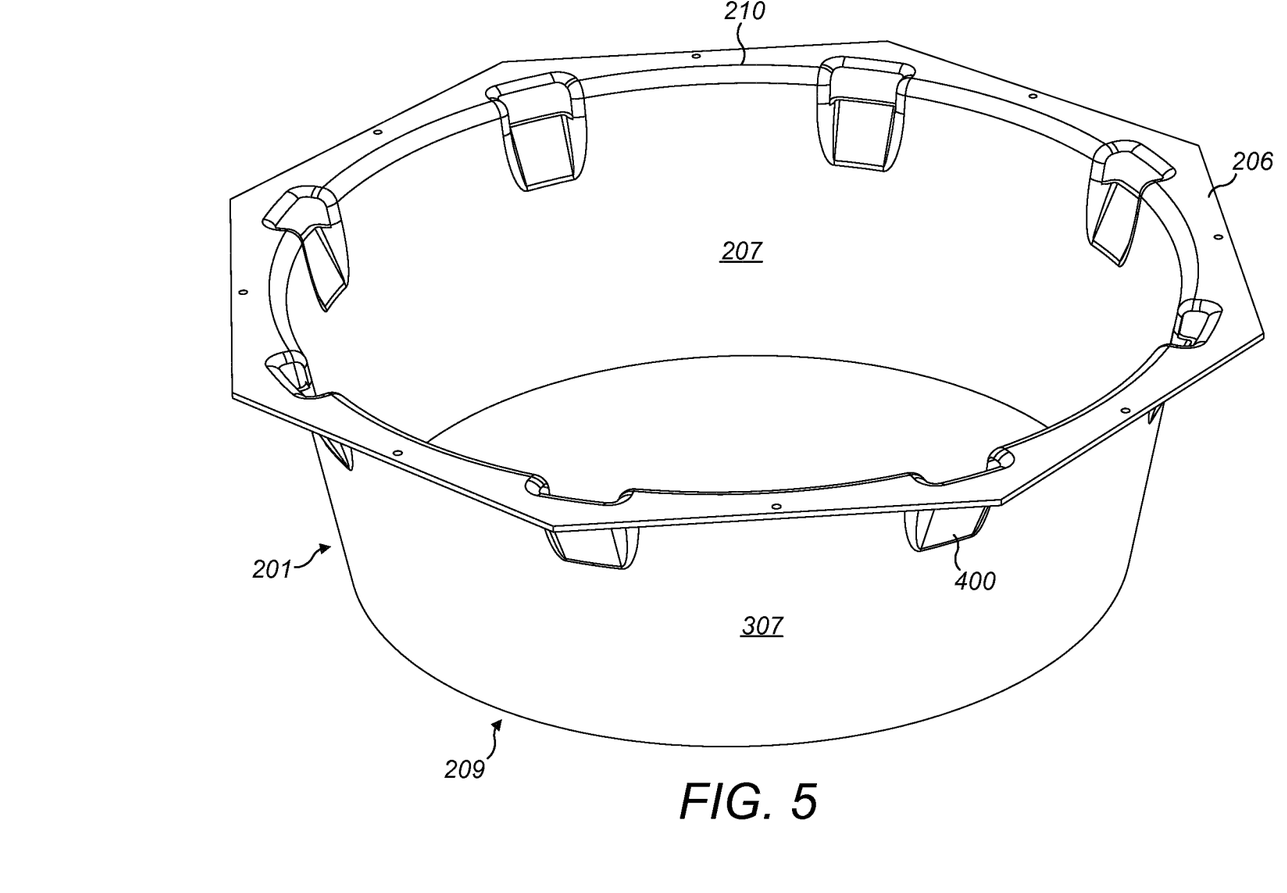
FIG. 5 illustrates a perspective view of a holder funnel element, suitable for use with the wear resistant funnel sheet element according to the invention.

As seen in FIG. 4, the conical flexible funnel element 103 comprises an annular outlet end 107 and a corresponding annular inlet end 108. As seen in FIG. 5, the conical holder element 201 similarly comprises a first annular end 209 and a second (inlet) end 210. An axial length of the flexible funnel element 103 is appreciably greater than a corresponding axial length of holder element 201 such that funnel element 103 defines the majority of the axial length of funnel section 101 between the inlet and outlet. As seen in FIG. 6, funnel element 103 is mounted to extend over and about holder element 201 such that the respective inlets 108, 210 are aligned axially. Due to the relative difference in the axial lengths, the outlet 107 of funnel element 103 is axially separated from the first end 209 of the holder element 201 to define an axial section 109 that represents the exposed material contact region of funnel section 101.

Guide ring 202 extends radially around holder element 201 at the region of the axially co-aligned inlets 108, 210. Guide ring 202 comprises a plurality of radially outward extending flanges 206 configured to provide suitable mounting regions to support or suspend guide chute 100 at an auxiliary support structure (not shown) and to interconnect the funnel sections 101 axially to form the unitary telescopic arrangement of FIG. 1.

In a preferred form, guide ring 202 comprises a generally rigid structure that may be formed from a metal, such as a steel or a suitable polymer having a desired hardness/rigidity. Holder element 201 comprises a second material having a desired hardness/rigidity to support the mounting of the funnel element 103 and to maintain the annular and truncated cone shape profile at the inlet 210 as material falls through the guide chute and against each material contact section 109. In particular, each holder element 201 comprises a material or material composition having a hardness/rigidity being greater than that of the material or material composition of each corresponding funnel element 103, which is relatively flexible by comparison. According to the specific implementation, the holder element 201 comprises a Shore D hardness of 40 to 60° whilst the flexible funnel element 103 comprises a Shore A hardness of 40 to 90°, most preferably 60°, according to ASTM D2240 testing standard.

Accordingly, flexible funnel element 103 comprises a material that freely distorts so as to bend, flex and twist in use and be capable of folding for transport and to facilitate stacking when not in use. Holder element 201 in contrast comprises a material or composition to impart structural support to the flexible funnel element 103 and to prevent it deflecting laterally at the region of inlet 108 so as to ensure material is transferred downwardly into each successive funnel section 101. The present funnel sections 101 comprise regions with a desired rigidity to establish and maintain a robust chute construction whilst comprising regions with enhanced flexibility to prevent blockage or the accumulation of material within the funnel sections 101. Such advantages are provided by configuration and in particular the flexibility/hardness of the sheet element 104 from which funnel element 103 is constructed as will be herein described.

Figure 1:
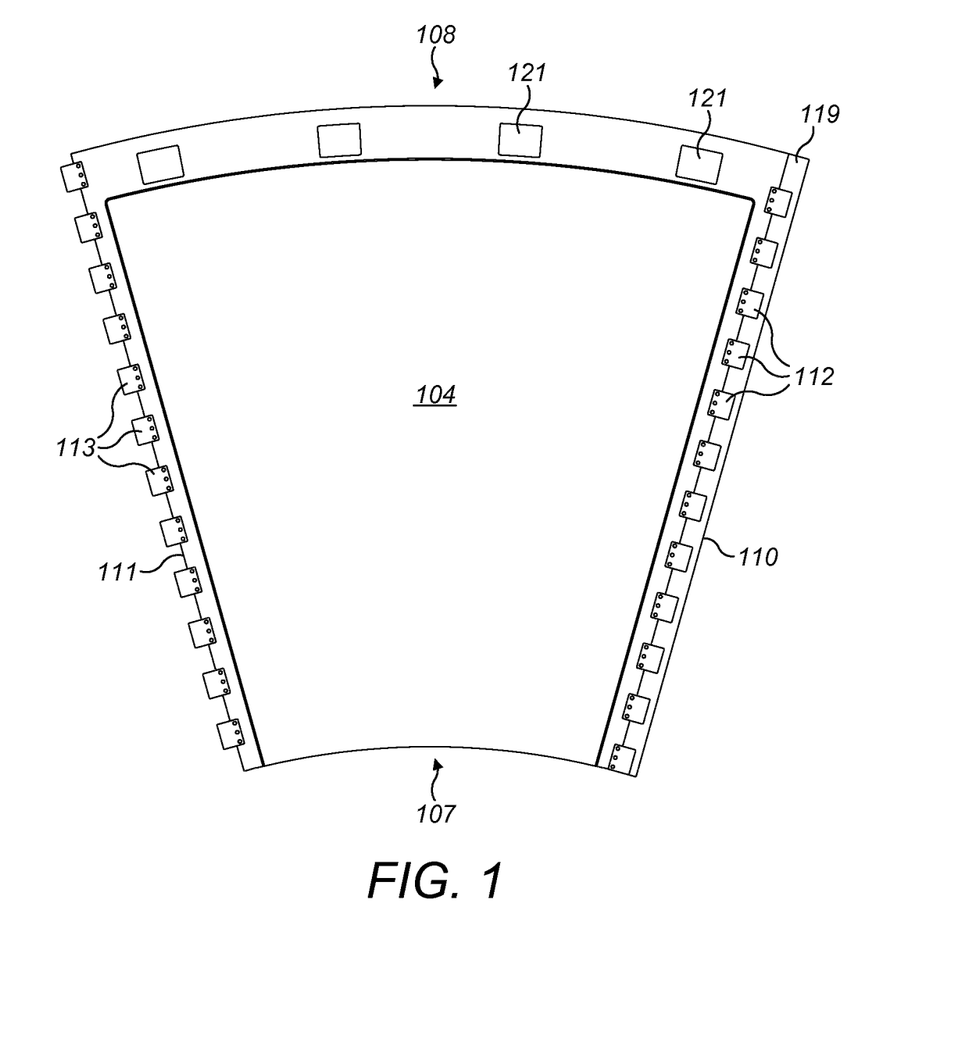
FIG. 1 illustrates a front view of a wear resistant funnel sheet element according to a specific implementation of the present invention.
Figure 2:
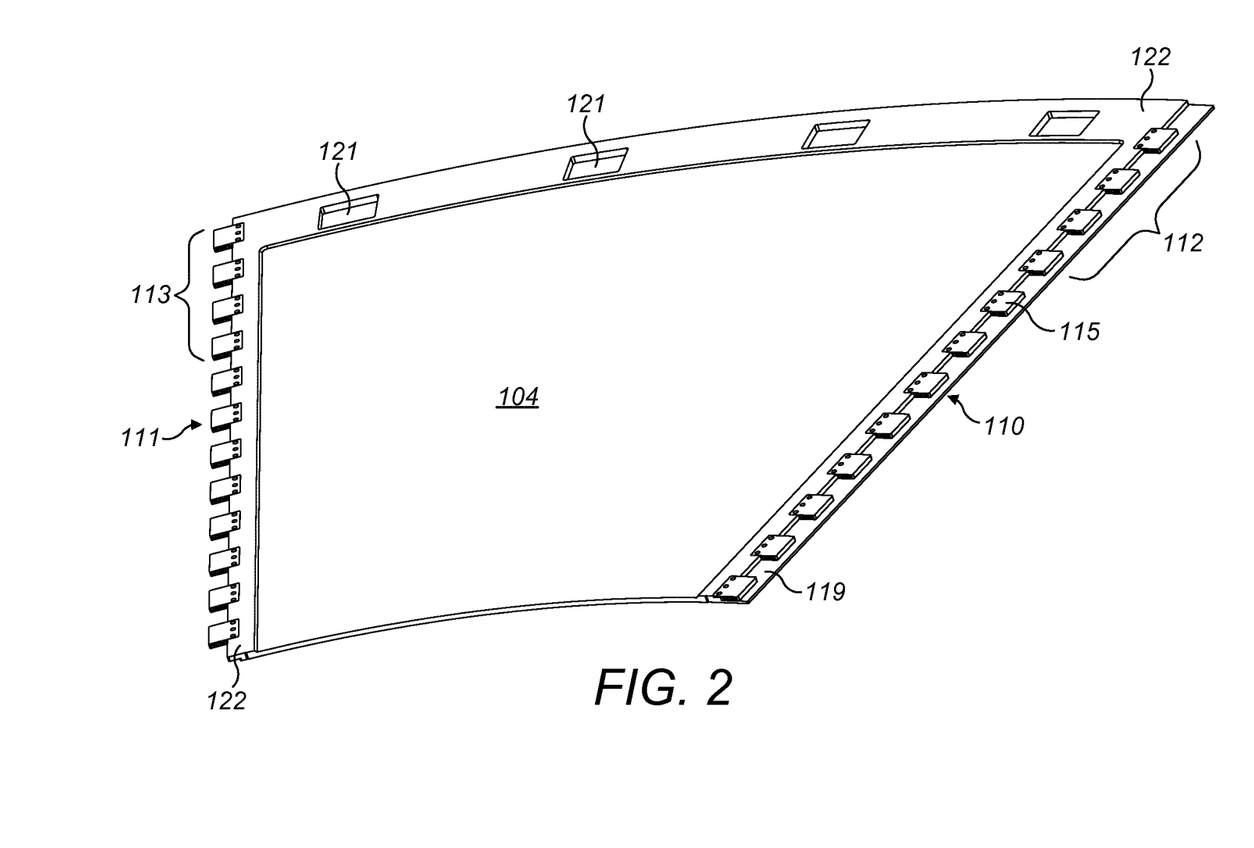
FIG. 2 illustrates a perspective view of the sheet element from FIG. 1.

FIGS. 1 and 2 best illustrate a preferred embodiment of sheet element 104, from which funnel elements 103 are constructed. Particularly, sheet element 104 is moulded from wear resistant flexible material as a flat piece that can be stacked for transport/distribution prior to assembly. The flat sheet element 104 includes a convex edge corresponding to the wider inlet end 108 of funnel 103 and a concave edge corresponding to the narrower outlet end 107 of funnel 103. Opposing first and second side edges, 110 and 111 respectively, of the flat sheet are tapered and converge toward the outlet end 107 so as to result in a cone shape during assembly. The general geometry of such a component will be apparent to a skilled person. Particularly, a single sheet element 104 could be configured to be flexed/rolled into a cone shape or, as illustrated by FIG. 4, two sheet elements are combined to result in a complete frustoconical funnel element 103.

Each side edge 110 and 111 includes a plurality of fastening features 112, 113 that cooperate with each other to form a seam 114 of completed funnel 103. It will be apparent that the fastening features 112 of the first side edge 110 will cooperate with fastening features 113 of any second side edge 111, whether these are on the same sheet element 104 or a second or further sheet element 104. In alternative forms a fastening feature may only be present on one of the edges, to receive and hold a plain edge.

Figure 3:
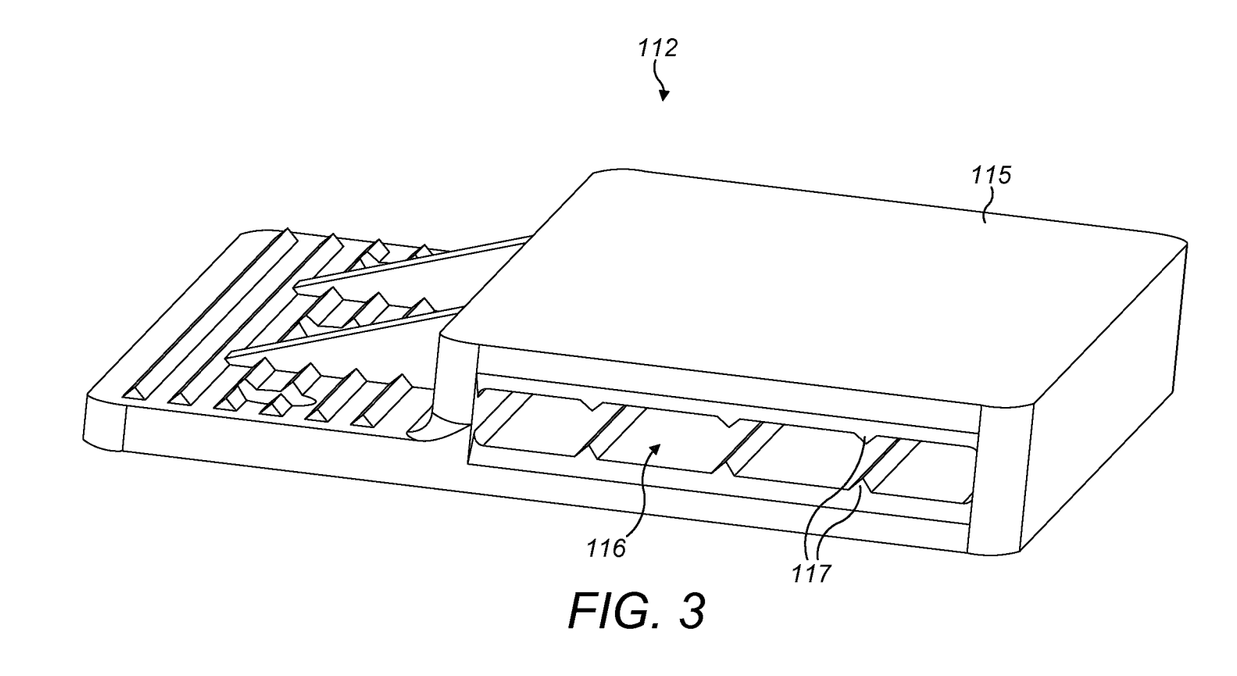
FIG. 3 illustrates a perspective view of a fastening feature according to the invention.

While the exact mechanism of fastening between edges 110 and 111 should not be limited according to the broadest aspects of the invention, the illustrated example shows a row of interlinkable inserts 115, shown in detail by FIG. 3. Each insert 115 is a moulding that features a flattened opening 116 and integral teeth 117 suitable for receiving a rod element 118 that is visible in FIG. 4. The material of insert 115 is likely to be harder than the overall flexible material of sheet 104. Teeth 117 preferably reduce friction and facilitate smooth insertion of the rod 118.

During assembly, multiple inserts 115 form the fastening features 112, 113 and interlink together such that openings 116 of adjacent inserts align and a rod 118 can be threaded therethrough to secure a seam 114 in place. According to the embodiment of FIG. 4, two sheet elements 103 can be joined together (edge 110 to edge 111) in an initially flat configuration and then flexed/rolled into a frustoconical shape where free edges 110 and 111 are joined together by virtue of the fastening features 112, 113 and a second rod 118.

FIG. 4 shows rod 118 with an exaggerated length so it is clearly visible. In practice, rod 118 would be flush with the annular inlet 108 and outlet 108 respectively. In alternative forms of assembly the funnel element may be closer to a frustopyramid shape where the sheet elements are not substantially curved. Such an embodiment is clearly anticipated by the present invention.

Rod 118 is maintained in place by suitable means, e.g. a fastener or flange at one end which prevents longitudinal sliding movement. Disassembly can be performed simply by pushing rod 118 through a first opening 116 by a suitable tool, to expose a distal end, and further extracting rod 118 via its exposed end.

FIGS. 1 and 2 show provision of a protective flange 119 extending along edge 110 of sheet element 104. Inserts 115 of the first set of fastening features 112 are located against flange 119 and do not overlap edge 110, whereas inserts 115 of the second set of fastening features 113 extend beyond edge 111 and are, therefore, more exposed. By virtue of this construction, when funnel 103 is formed by flexing sheet element(s) 104 into a cone shape (into the page from the perspective of FIGS. 1 and 2) flange 119 will ensure that the fastening means 112/113 are covered and therefore not visible/exposed at the interior wall surface 120 of the assembled funnel 103 shown in FIG. 4. Protective flange 119 prevents damage to the inserts 115 and ensures a smooth wall is presented to material falling through the chute.

As previously described with reference to FIG. 4, funnel element 103 is formed from two axially extending halves made up from sheet elements 104, coupled together via their respective axially extending edges 110/111 to define the frusto-conical funnel shape. Each sheet element 104 and corresponding funnel 103 comprises a plurality of holes 121 extending therethrough and positioned axially at or towards inlet 108. Holes 121 are spaced apart circumferentially by a distance corresponding to projections 400 of the holder funnel element 201. As the body of funnel 103 is mated against and around the body of holder 201, each respective projection 400 is configured to extend through each hole 121. Accordingly, the funnel components 103 and 201 are coupled axially via the mating contact between each hole 121 and each projection 400. That is, the flexible funnel element 103 is suspended over and about holder element 201 via projections 400 mating into holes 121. Each projection 400 is tapered radially outward from the wall of holder 201 such that during assembly, internal surface 120 is capable of sliding over the external surface 307 of holder element 201 including the axial length of each projection 400 until the projections 400 are received with the holes 121.

It is particularly apparent from FIG. 2 that sheet 104 may be moulded with various areas of increased thickness 122 around its edges which provide additional strength. Particularly, the thicker areas 122 correspond to where fastening is required that can impart increased stress to the material. Such manufacturing techniques are known in the art and any suitable modifications can be implemented to optimise material use.

Funnel sections 101 may be maintained at their respective positions as illustrated in FIG. 7 via axially extending chains, cables, straps and/or a sheath (not shown) optionally attached to each funnel section 101 via guide ring flanges 206.

It is clear from the foregoing description that the sheet element 104 is adapted as a flexible wear part to, when formed into a funnel 103, withstands abrasive contact with bulk material as it falls generally vertically through the guide chute 100 and in contact with the internal facing surface 120. As illustrated in FIG. 7, as the outlet 107 of each neighbouring section 101 axially overlaps to sit within the two axial ends 209, 210 of holder element 201, the falling material, in general, does not contact holder element internal surface 207. Instead, the material is guided vertically downward by the flexible funnel element 103. Accordingly the service lifetime of holder element 201 will be greater than flexible element 200 that functions as a wear part.

Referring to FIG. 7, the inlet is a larger diameter than the outlet and thus there is a taper relative to axis 102 of approximately 5 to 15°. An axial length of flexible funnel element 103 between inlet and outlet 108, 107 is greater than a corresponding axial length of holder element 201 between respective axial ends 209, 210. In particular, the holder length is in the range 10 to 50% and, in particular 20 to 30%, of the funnel length. Accordingly, approximately 60 to 70% of the axial length of funnel element 103 is exposed to contact material falling through chute 100. As such, the majority of the funnel sections 101 are configured to deform and flex relative to axis 102 to prevent material accumulating and blocking chute 100. The relatively lightweight funnel 103 when not in use may be folded easily for convenient packaging and transport or disassembled into component parts 104. Chute sections 101 may be collapsed axially when complete disassembly is not required.

The present multi-component funnel sections 101 are advantageous to allow the convenient separation of the component parts for recycling and to optimise the mechanical and physical properties of the different components 104, 201, 202 with regard to flexibility, rigidity, wear resistance and load bearing capability. The present modular construction also accommodates different configurations of conical sections 101. For example, the wear rate of the flexible sheet element 104 may be adjusted by variation of the radial thickness and the choice of constituent material or material composition. Similar design variation is also possible by selective adjustment of a corresponding radial thickness and/or axial length wall of holder element 201.

According to further specific implementations, guide ring 202 may be encapsulated or partially encapsulated within holder element 201 during manufacture and in particular moulding. For example, the holder ring 202 may be formed integrally within the holder element 201 including in particular flange 206 that may extend to envelope guide ring 202.

The context of the invention is important because, generally, flat sheets are known to be curled into cylindrical or cone shapes, however, not for the purpose of forming a section of a material guide chute. Prior art such as GB20175372, US20110041954 or US20150284183 may disclose some structural similarities, but not in the context of the invention as it is configured for novel use as a telescopic material guide chute.

The invention claimed is:

1. A wear resistant funnel sheet element for a material guide chute, comprising:
    a first edge and a second edge, the first edge and the second edge being located oppositely and at a tapered angle to each other; and
    a plurality of fastening features located at the first and second edges, the first edge being arranged to mate with the second edge for forming a funnel element from at least one of said wear resistant funnel sheet elements, the plurality of fastening features being a plurality of interlinking connector elements arranged to form a frustoconical or frustopyramid shape funnel element from the at least one of said wear resistant funnel sheet elements, the plurality of interlinking connector elements forming a releasable connection between the first and second edges of either the same wear resistant funnel sheet element or a combination of two or more wear resistant funnel sheet elements, wherein each of the plurality of interlinking connector elements includes a through-hole that align together in combination, the alignable through-holes being arranged such that the through-holes of adjacent interlinking connector elements align to receive a rod element therethrough to form a seam joining the first and second edges, the through-holes including protruding structures arranged to facilitate insertion of the rod.

2. The wear resistant funnel sheet element of claim 1, including an inlet end edge located at a wider end of the first and second edges, said inlet end edge including a connection structure for releasable connection with a holder funnel element when the funnel element is assembled.

3. The wear resistant funnel sheet element of claim 2, further comprising an outlet end edge located at a narrower end of the first and second edges, said outlet end edge being straight or concavely curved and the inlet end edge being straight or convexly curved.

4. The wear resistant funnel sheet element of claim 1, wherein the first edge includes a flange overhanging the fastening features, such that, when formed into a funnel element the fastening features are covered at an internal wall thereof.

5. The wear resistant funnel sheet element of claim 1, the sheet element being moulded as a flat piece from a material having a Shore A hardness of 50-70°.

6. The wear resistant funnel sheet element of claim 1, wherein an angle by which a wall of the assembled funnel element extends relative to a longitudinal axis thereof is in the range 3 to 30°, 5 to 20°, 6 to 18°, 8 to 14° or 10 to 13°.

7. A material guide chute comprising a plurality of funnel sections, arranged telescopically, each funnel section including a funnel element and a holder funnel element interconnected axially, wherein the funnel element includes at least one wear resistant funnel sheet element according to claim 1.

8. The material guide chute of claim 7, wherein a flexibility of the funnel element is greater than a flexibility of the holder funnel element.

9. The material guide chute of claim 7, wherein the funnel element is located radially around a connecting wall of the holder funnel element.

10. A method of constructing a funnel element for connection to a holder funnel element in order to form a funnel section for a material guide chute, including the steps of:
   providing at least one wear resistant funnel sheet element having fastening features at a first edge thereof;
   fastening the first edge via the fastening features to a second edge of the same or another funnel sheet element and, by bending about a longitudinal axis, forming the funnel element into a frustoconical or frustopyramid shape, the fastening features being interlinking connectors located at both the first and second edges, wherein each of interlinking connector element includes a through-hole that align together in combination, the through-holes being arranged such that the through-holes of adjacent interlinking connector elements align to receive a rod element therethrough to form a seam joining the first and second edges, the through-holes including protruding structures arranged to facilitate insertion of the rod; and
   threading a rod element through the alignable through-holes to fasten the respective first and second edges together, the alignable through-holes including protruding structures arranged to facilitate insertion of the rod element.

11. The method according to claim 10, wherein the fastening features are interlinking connectors located at both the first and second edges that include a plurality of alignable openings, wherein a rod is threaded through said alignable openings in order to fasten the respective first and second edges together.

* * * * *